United States Patent [19]

Hayashi et al.

[11] Patent Number: 4,731,008

[45] Date of Patent: Mar. 15, 1988

[54] APPARATUS FOR CONTINUOUSLY STRETCHING A STRIP OF DOUGH

[76] Inventors: Torahiko Hayashi, 3-4, Nozawa-machi; Koichi Hirabayashi, 942-16, Mobara-cho, both of Utsunomiya-shi, Tochigi-ken, Japan

[21] Appl. No.: 893,979

[22] Filed: Aug. 7, 1986

[30] Foreign Application Priority Data

Aug. 7, 1985 [JP] Japan .................. 60-173745

[51] Int. Cl.⁴ ............................................. A21C 3/02
[52] U.S. Cl. .................................. 425/335; 425/363; 425/373
[58] Field of Search ................ 425/372, 373, 363, 335

[56] References Cited

U.S. PATENT DOCUMENTS

| | | | |
|---|---|---|---|
| 3,973,895 | 10/1976 | Hayashi | 425/372 |
| 4,113,412 | 9/1978 | Hayashi | 425/373 |
| 4,192,636 | 3/1980 | Hayashi | 425/373 |
| 4,421,776 | 12/1983 | Brinkers et al. | 425/373 |

*Primary Examiner*—Willard E. Hoag

*Attorney, Agent, or Firm*—Guy W. Shoup

[57] ABSTRACT

An apparatus for continuously stretching confectionary dough, bread dough, and the like, is provided.

The apparatus comprises a conveyor mechanism including an entrance belt conveyor, an intermediate belt conveyor, and an exit belt conveyor, and a roller mechanism to roll out a strip of dough cooperatively with the conveyor mechanism.

The angles between the upper flights of the entrance and intermediate belt conveyors and the straight portion of the roller mechanism can be adjusted in response to the change in the dough thickness and properties.

A first variable speed drive device moves the entrance belt conveyor, and a second variable speed drive device moves the intermediate and exit belt conveyors. A control device adjusts the speed ratio between the first variable speed drive device and the second variable speed drive device, in response to the change in the thickness of the dough supplied onto the apparatus and to the change in the production amount.

9 Claims, 4 Drawing Figures

APPARATUS FOR CONTINUOUSLY STRETCHING A STRIP OF DOUGH

BACKGROUND OF THE INVENTION

1. Field of the Invention

The present invention relates generally to stretching dough, such as confectionary dough, bread dough, or the like, and particularly, to an apparatus for continuously stretching a strip of dough, fed in various thicknesses, into a thin sheet of dough.

2. Description of Prior Art

U.S. Pat. No. 4,113,819 discloses a stretcher comprising three serially arranged belt conveyors and an endless roller mechanism arranged above the conveyors.

Although the upper flight of the entrance belt conveyor of the stretcher in this prior art is adapted to have an angle against the lower straight portion of the endless roller mechanism, the relationship between the upper flight of the entrance conveyor and the straight portion of the endless roller mechanism is stationary. It is, therefore, impossible to retain a specified area where both the upper flight and the straight portion of the roller mechanism fully contact the dough fed therebetween regardless of the change in the thickness of the dough supplied onto the stretcher.

Australian Patent No. 545,313 discloses a stretcher comprising two serially arranged belt conveyors and an endless roller mechanism.

This stretcher can angularly adjust the upper flight of an entrance belt conveyor in relation to the straight portion of the roller mechanism in response to the change in the dough thickness. Also, the feed speed ratio between the two conveyors can be varied to control the feed speed of the entrance belt conveyor.

Although the stretcher in this prior art performs fairly well, a sufficient stretching effect cannot be obtained when a high ratio of thickness reduction by stretching is required, because stretching is carried out between only two belt conveyors.

In general, when a viscoelastic material, such as bread dough or confectionary dough, which generally has a low resistance against exterior force and whose properties are not uniform, is to be stretched to exact dimensions, gentle stretching by the largest possible number of conveyors gives superior results.

To obtain such superior results, an apparatus with three conveyors has been studied. In such an apparatus, the feed speed of the intermediate conveyor relative to those of the inlet and outlet conveyors had to be experimentally determined for each kind of dough, since there is no single formula that can be applied to all viscoelastic materials, which have widely varying properties.

Further, even with the same dough, an additional condition must be taken into account for the determination of the feed speed of the intermediate conveyor when the stretching rate is changed. Thus, an apparatus of this kind has been manufactured on the basis of data almost comparable to a data table of random numbers, leading to a very complex clutch mechanism for the apparatus.

SUMMARY OF THE INVENTION

It is an object of the present invention to provide an apparatus for continuously stretching a strip of dough.

It is another object of the present invention to provide an apparatus for gradually stretching a relatively thick dough strip into a thin sheet of dough by using three belt conveyors.

It is a further object of the present invention to provide an apparatus for stretching dough in which the gradients of the upper flights of an entrance belt conveyor and an intermediate belt conveyor can be adjusted.

It is still a further object of the present invention to provide an apparatus for stretching dough, in which the control of the feed speeds of the three conveyors is simplified.

In one aspect of the present invention, an apparatus for continuously stretching a strip of dough is provided, comprising:

a base, a conveyor mechanism comprising a plurality of serially arranged belt conveyors, including an entrance belt conveyor, an intermediate belt conveyor, and an exit belt conveyor, the speed of each conveyor being variable, the speed of any downstream conveyor of the plural conveyors being higher than that of the nearest upstream conveyor, dough holding means, including a roller mechanism comprising a plurality of rollers rotatable about their axes and movable along a path, including a straight portion, above the plural conveyors, moving at a speed higher than that of the conveyors, the straight portion of the roller path being positioned over the plural conveyors, thereby holding the dough fed between the roller mechanism and the plural conveyors to produce the strip of dough, characterized by;

means to swing the upper flights of the entrance belt conveyor and the intermediate belt conveyor, comprising a first frame supporting the two upper flights, a first pivot mounted on the base and disposed at or adjacent the downstream end of the intermediate conveyor to swing the first frame, a first lowering the lifting means to move the first frame vertically, thereby adjusting the angles of the upper flights of the entrance conveyor and the intermediate conveyor to the straight portion of the roller mechanism.

The apparatus of the invention comprises a conveyor mechanism including an entrance belt conveyor, an intermediate conveyor, and an exit belt conveyor, and a roller mechanism. These conveyors are serially arranged to convey a strip of dough at different speeds, and the feed speed of any downstream belt conveyor is higher than that of the nearest upstream belt conveyor. The entrance belt conveyor is driven by a first variable speed drive device, and the intermediate belt conveyor and the exit belt conveyor are driven at a specified ratio by a second variable speed drive device. A control device adjusts the feed speed and ratio of the two drive devices, responding to the change in the thickness or properties of the dough fed onto the entrance belt conveyor and to the change in the production amount. A change in the production amount results from a change in the speed required for feeding out dough sheets.

The upper flights of the entrance belt conveyor and the intermediate belt conveyor are angularly changeable against the lower straight portion of the roller mechanism by swinging the upper flights of the two conveyors about a pivot at or adjacent the downstream end of the intermediate belt conveyor.

The apparatus of the invention thus constructed as aforementioned has the following performance:

First, the upper flight of the entrance belt conveyor and the straight portion of the roller mechanism are secured to fully contact the dough fed therebetween for a specified distance regardless of the kind or thickness of dough supplied. This is achieved by changing the angle therebetween, thereby steadily holding the dough so as to stretch the dough located on the entrance and intermediate belt conveyors.

Second, since the pivot is positioned at or adjacent the downstream end of the intermediate belt conveyor, the change in a vertical distance between the upper flight of the intermediate belt conveyor and the lower straight portion of the roller mechanism remains relatively small, even at points other than the point corresponding to the axis of the pivot, even though the upper flight is moved. Therefore, the ratio of the feed speed of the intermediate belt conveyor against that of the exit belt conveyor can be set at a specified value, and only the relation of the feed speed of the entrance conveyor to that of the two conveyors is required to be taken into account, to respond to the change in the thickness or properties of the dough fed onto the apparatus, and to the change in the production amount.

DESCRIPTION OF THE PREFERRED EMBODIMENTS

A first embodiment of the present invention will now be described by reference to the drawings.

Figure 1:
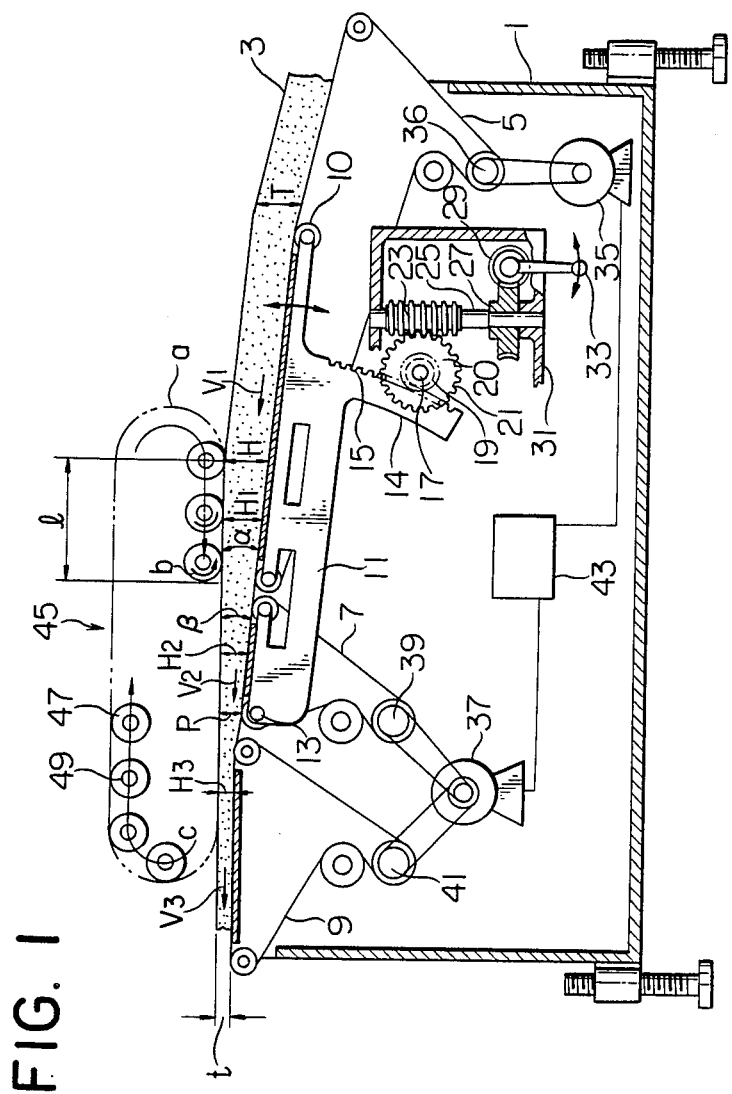
FIG. 1 is a schematic side elevational view, partly in cross-section, of a first embodiment of the present invention.
Figure 2:
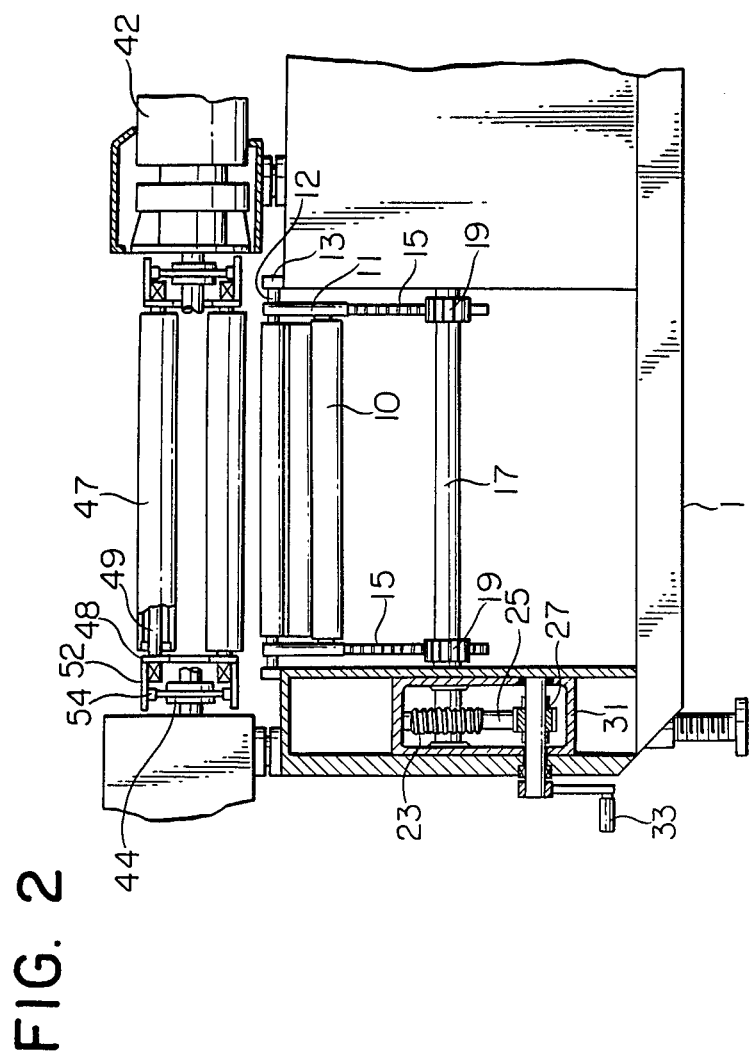
FIG. 2 is a schematic front elevational view, partly in cross-section, of the first embodiment of the present invention.

In FIGS. 1 and 2, an entrance belt conveyor 5, an intermediate belt conveyor 7, an exit belt conveyor 9, and an endless roller mechanism 45, are mounted on a base 1. A first variable speed drive device 35 is mounted on the base 1, and drives the entrance belt conveyor 5 through a drive roller 36, whereby dough 3 having a thickness of T is fed between the roller mechanism 45 and the upper flight of the entrance conveyor. A second variable speed drive device 37 is mounted on the base 1, and drives the intermediate belt conveyor 7 and the exit belt conveyor 9 through a driven roller 39 and a driven roller 41, respectively, at a specified speed ratio relative to both the conveyors 7 and 9. Although the feed speed ratio between the conveyors 7 and 9 is fixedly determined based on the production amount and the thickness of the dough desired, by calculating the speed and dough thickness, the ratio may be modified by changing the size of the pulleys of the drive device 37 and the driven rollers 39 and 41, if necessary. A control device 43 is mounted on the base 1, which includes a control panel and built-in inverters. Each of the inverters is connected between a power source and each of the drive devices 35 and 37, and varies frequencies of the line voltage of the power source to change the rotation numbers of each of the drive devices 35 and 37, based on input signals directed by the control panel, whereby the drive speeds of the first and second drive devices 35 and 37 can be changed, while keeping the specified feed speed ratio between the intermediate and exit belt conveyors 7 and 9.

A frame 11 is pivotally mounted to swing about a pivot 12 which is received in bearings 13 mounted on the base 1. The frame 11 supports the upper flights of the entrance and intermediate belt conveyors 5 and 7. The upper flight of the entrance belt conveyor is supported by a plate at the area downstream of a position at which a roller 10 is rotatably mounted on the frame 11. The frame 11 has a pair of side walls, one on each side of the apparatus (FIG. 1 shows one of the side walls), and each side wall has a projection 14 extending downwardly from its main body. One side of the projection 14 has racks 15 meshing with a pinion 19 provided on a shaft 17. The shaft 17 is provided with a worm wheel 20 having at its periphery a gear 21 meshing with a worm gear 23 provided on a shaft 25 provided with a worm wheel 27 meshing with a worm gear 29. These gears and the shaft 17 are accommodated in a gear box 31 mounted on the base 1. The upper flights of the two conveyors are angularly moved by turning a handle 33 connected to the shaft of the worm gear 29, through the wall of the gear box 31.

The endless roller mechanism 45 is mounted on the base 1, above the conveyors, and comprises a plurality of rollers 47 which are freely rotatable about their shafts 49 in the direction as indicated by an arrow b, and movable in unison by a drive device device 42 in the direction as indicated by an arrow c. The power of the drive device 42 is transmitted through sprockets 44, chains 54, and chain attachments 52 to shafts 49. The movement of the rollers 47 forms a locus of an endless path as indicated by an arrow a having a lower straight portion. The rollers 47 move, at a speed faster than the speed of any belt conveyor, to hold the dough under the straight portion against the belt of the entrance, intermediate, and exit conveyors, and to repeatedly roll the dough.

To satisfactorily accomplish the stretching, the dough on the entrance conveyor must fully contact the straight portion for a distance l, as indicated in FIG. 1, as well as contacting the upper flight of the entrance belt conveyor 5. To achieve this, an angle $\alpha$ forming between the lower straight portion and the upper flight of the entrance conveyor must be changed in response to a change in the dough thickness T fed onto the apparatus so that the clearance H between the lower straight portion and the upper flight of the entrance conveyor at the point where the lower straight portion starts becomes equal to the thickness T.

An angle $\beta$ between the upper flight of the intermediate conveyor 7 and the straight portion of the roller mechanism is concurrently changed, together with the change of the angle $\alpha$ by the pivotal movement of the frame 11. The reduction of the vertical sectional area of the dough 3 due to the stretching is balanced by the reduction of the clearance between the lower straight portion and the upper flights of the conveyors. By the rolling pressure imparted to the dough 3 by the rollers 47, the tensile stress in the dough is averaged, and the dough is uniformly stretched without being torn.

Assuming that the width of the dough is unchanged throughout the stretching, and the dough resilience is zero, the following equations approximately hold:

$$H_1 \times V_1 = H_2 \times V_2 \tag{1}$$

$$H_2 \times V_2 = H_3 \times V_3 \tag{2}$$

$$H_1 \times V_1 = H_3 \times V_3 \quad (3)$$

where $H_1$, $H_2$, and $H_3$ are representative values of the clearances between each upper flight and the straight portion, which correspond to the dough thickness stretched, and $V_1$, $V_2$, and $V_3$ are the feed speeds of the entrance, intermediate, and exit belt conveyors, respectively.

In general, when dough is stretched by a stretcher which has three serially arranged conveyors, the dough should, in principle, be fed on each conveyor at speeds derived from, and in line with, equations (1), (2), and (3) above.

This data is calculated as follows:

First, the thickness of dough $H_3$ to be stretched, the feed speed $V_3$, and the thickness of dough $H_1$ to be supplied, are determined, then the feed speed $V_1$ is calculated from equation (3). The feed speed $V_2$ may be generally calculated from either the equation (1) or the equation (2) after clearance $H_2$ is determined.

This calculation procedure is needed when the thickness of the dough to be supplied into the apparatus or the production amount is changed.

As a result, the feed speed ratio between the three conveyors varies when the stretching requirements are changed.

In the apparatus of the present invention, the pivot of the swinging movement of the conveyors is positioned at or near the downstream end of the intermediate conveyor 7. Accordingly, a clearance P at this end is almost unchanged, even if the upper flight of the conveyor 7 is swung to vary the angle $\beta$. Therefore, it may be said that the ratio of P to $H_3$ is also constant. Such relationship can even be roughly applied at a point other than the point where the clearance is P. Therefore, after the feed speeds $V_1$, $V_2$, and $V_3$ are first determined according to equations (1), (2), and (3), the speed ratio between the intermediate and exit conveyors can be fixedly set using thus determined values $V_2$ and $V_3$. This specified ratio is applicable even when the angle $\beta$ is changed, if the stretching operation is carried out in a reduction range of dough of about 10:1. It has been found that, if the stretching operation is within the above range, the difference between the feed speed $V_2$, in line with and derived from equation (1) and the feed speed $V_2$, which is derived from the originally determined speed ratio relative to the intermediate and exit belt conveyors, may be neglected, even when the thickness of the dough or the production amount is changed.

Consequently, the feed speed $V_1$ of the entrance belt conveyor 5, calculated from the equation (3) in response to the change in the thickness of the dough to be fed into the apparatus, and the feed speed $V_3$ predetermined are given to the control device 43, as input signals. As the feed speed $V_2$ of the intermediate conveyor 7 is proportionate to the feed speed $V_3$, the feed speed $V_2$ of the intermediate conveyor 7 is automatically determined. Thus, the inverters vary the frequencies of supplied voltages to change the rotation numbers of the drive devices 35 and 37, in response to input signals directed by the control panel. As a result, conveyor 5 is driven at the feed speed $V_1$, the conveyor 9 is driven at the feed speed $V_3$, and the conveyor 7 is driven at feed the speed $V_2$, which is automatically set based on the specified proportional relation.

When the production amount increases, the speed feed $V_1$ is derived from the equation (3), and the speed $V_1$ and the speed $V_2$ predetermined are given to the control device 43.

If the speed $V_3$ is doubled, the speed $V_2$ is also doubled. Accordingly, the speed ratio between the entrance and intermediate conveyor can be adjusted by the control device.

Figure 3:
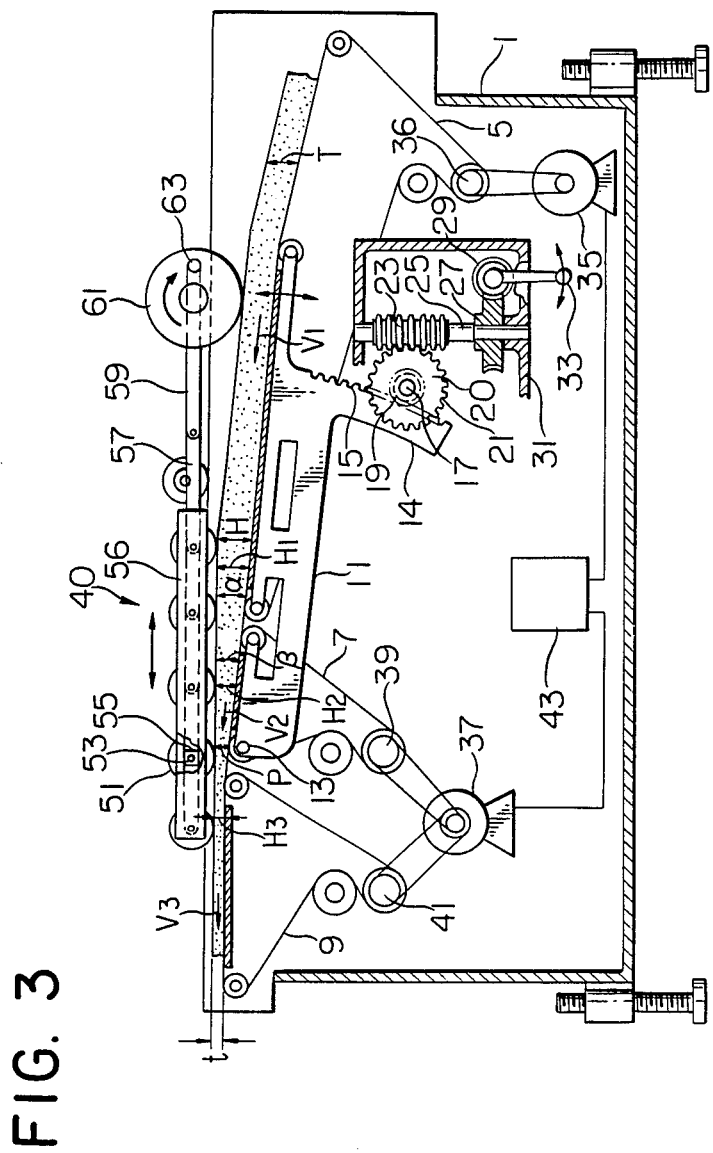
FIG. 3 is a schematic side elevational view, partly in cross-section, of a second embodiment of the present invention.

A second embodiment of the invention will now be described by reference to FIG. 3.

In the second embodiment, a roller mechanism 40 is mounted, above the conveyors 5, 7, and 9, on the base 1, in place of the endless roller mechanism 45 employed in the first embodiment. A plurality of rollers 51 are arranged in parallel, and adapted to freely rotate about their shafts 53 which are fixedly connected to sliding members 55, which can slide within grooves (not shown) provided inside roller frames 56. The shafts 53 are fixedly connected to a pair of connecting arms 57 in the vicinity of each end of the rollers 51. The connecting arm 57 is a plate horizontally disposed, and it has holes to receive the shafts 53. The connecting arms 57 at both ends of the rollers are rotatably connected to one end of each of a pair of crank arms 59. The other end of each of the crank arms 59 is rotatably connected by means of a pin 63 to a point near the circumference of one of a pair of discs 61. The discs 61 are adapted to rotate through gears (not shown) by a drive device (not shown). When the drive device is energized, the rollers 51 move back and forth repeatedly. Since the rollers 51 rotate by the rolling friction with the surface of the dough, the rollers can impart uniform rolling pressure on the dough even when they move in reverse of the dough movement. Thus the dough can be stretched in the same manner as in the first embodiment.

Figure 4:
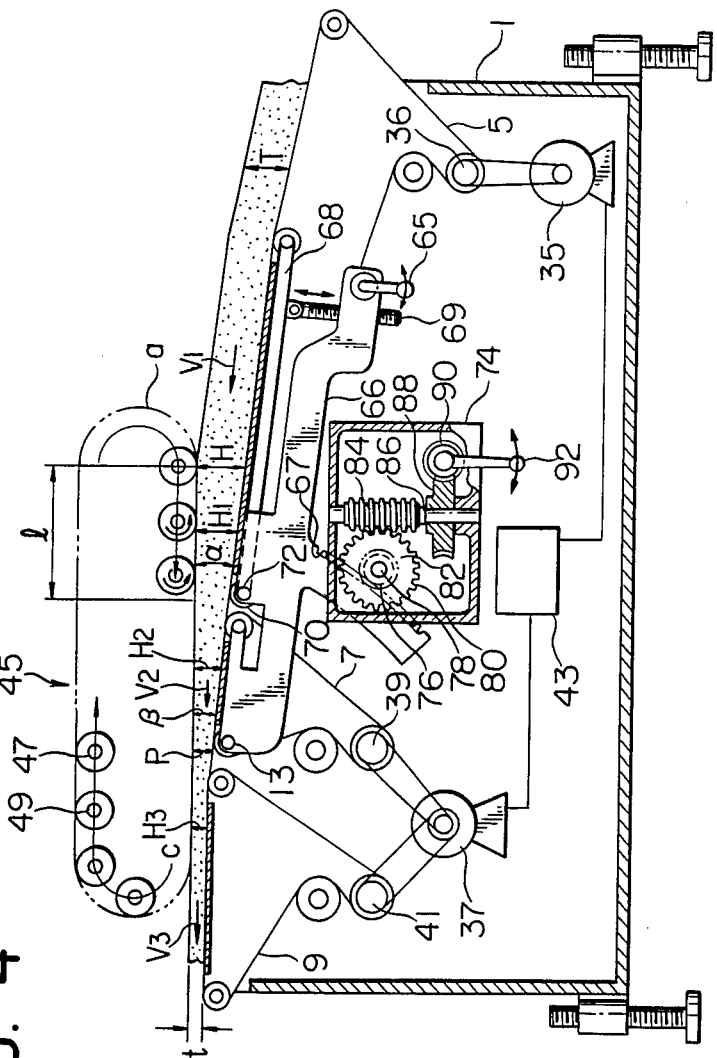
FIG. 4 is a schematic side elevational view, partly in cross-section, of a third embodiment of the present invention.

A third embodiment will now be described by reference to FIG. 4.

In the third embodiment, a second frame 68 is further mounted on a first frame 66, which corresponds to the frame 11 in the preceding embodiments, and is adapted to swing about a pivot (not shown) received in bearings 72 mounted on the base 1, upstream of the pivot point 12, for the first frame 66. The first frame 66, which is a pair of side walls, are on each side of the apparatus, and each side wall has downwardly extending projections, at one side of which there are provided with racks 67 meshing with a pinion 76 provided on a shaft 78. The shaft 78 is provided with a worm wheel 82, having at its periphery a gear 80 meshing with a worm gear 84 provided on a shaft 86, which, in turn, is provided with a worm wheel 88 meshing with a worm gear 90. A handle 92 is connected to the shaft of the worm gear 90, through the wall of the gear box 74. The upper flights of the entrance and intermediate belt conveyors are angularly moved by turning the handle 92. The second frame 68 supports the upper flight of the entrance belt conveyor 5. A thread shaft 69 is pivotally connected to the second frame 68 at its one end and extends through a hole (not shown) provided on the first frame 16, and meshes with a worm gear (not shown) to which a handle 65 is connected through the frame 66.

The upper flights of the intermediate conveyor and the entrance conveyor can be swung about the pivot 12 by turning the handle 92, and the upper flight of the entrance conveyor is swing about the pivot (not shown) received in the bearing 72, for adjusting the angle $\alpha$ exactly. In the third embodiment, the angles between the upper flights of the belt conveyors and the lower straight portion of the roller mechanism can be varied so that they decrease in the downstream direction, by adjusting the two handles 92 and 69, so that the dough is more uniformly and gently stretched.

It will be understood from the foregoing description that, in accordance with the present invention, the clearances between the upper flights of the entrance and intermediate belt conveyors and the lower straight portion of the roller mechanism can be changed to conform the thickness of the strip of dough to be fed into the apparatus, thereby attaining the high stretching effect.

Further, the speed ratio between the intermediate and exit belt conveyors can be fixedly set at a specified value, and the speed ratio between the entrance and intermediate conveyors can be adjusted by controlling the drive devices.

We claim:

1. An apparatus for continously stretching a strip of dough, which is fed from an upstream direction and stretched in a downstream direction, comprising:

a base, and a conveyor mechanism supported on said base comprising a plurality of serially arranged conveyors, including in order from the upstream direction to the downstream direction an entrance belt conveyor, an intermediate belt conveyor, and an exit belt conveyor, each conveyor running from an upstream end to a downstream end, the speed of each conveyor being variable, the speed of any downstream conveyor of the plural conveyors being higher than that of the nearest upstream conveyor, dough holding means, including a roller mechanism comprising a plurality of rollers rotatable about their axes and movable along a path, including a straight portion, above the plural conveyors, moving at a speed higher than that of the conveyors, the straight portion of the roller path being positioned over the plural conveyors, thereby holding the dough fed between the roller mechanism and the plural conveyors to produce the strip of dough; and means for adjusting an inclined feeding angle from the upstream direction between said straight portion of said roller path and said entrance and intermediate conveyors, including a first frame supporting the two conveyors, a first pivot mounted on the base and disposed at or adjacent the downstream end of the intermediate conveyor, wherein a downstream end of the frame is pivotally mounted to said first pivot, and a first lowering and lifting means for moving an upstream end of the frame vertically, thereby adjusting the feeding angle of the two conveyors from the upstream direction relative to the straight portion of the roller mechanism.

2. An apparatus of claim 1, wherein the entrance belt conveyor is supported by a second frame swingably mounted on a second pivot mounted on the first frame and disposed at or adjacent the downstream end of the entrance conveyor to swing the second frame, and further comprising a second lowering and lifting means to move the second frame vertically, thereby adjusting the angle of the entrance belt conveyor to the straight portion of the roller mechanism.

3. An apparatus of claim 1, further comprising first variable speed drive means to move the entrance belt conveyor, second variable speed drive means to move the intermediate belt conveyor and the exit belt conveyor at a specified ratio relative to themselves, and means to control the first variable speed drive means and the second variable speed drive means, thereby adjusting the speed ratio of the entrance belt conveyor relative to that of the intermediate belt conveyor.

4. An apparatus of claim 1, wherein the roller mechanism has freely-rotatable rollers arranged along an endless roller path, the peripheries of the moving rollers forming a closed envelope, the rollers moving along the path while rotating themselves, when in contact with the dough, in the same direction as the movement of the plural conveyors.

5. An apparatus of claim 1, wherein the rollers of the roller mechanism are freely rotatable about their axes and arranged on a straight roller path, and the roller mechanism comprising means for moving the rollers back and forth longitudinally over the conveyors on the straight path.

6. An apparatus of claim 2, wherein the roller mechanism has freely rotatable rollers arranged along an endless roller path, the peripheries of the moving rollers forming a closed envelope, the rollers moving along the path while rotating themselves, when in contact with the dough, in the same direction as the movement of the plural conveyors.

7. An apparatus of claim 2, wherein the rollers of the roller mechanism are freely rotatable about their axes and arranged on a straight roller path, and the roller mechanism comprising means for moving the rollers back and forth longitudinally over the conveyors on the straight path.

8. An apparatus of claim 3, wherein the roller mechanism has freely-rotatable rollers arranged along an endless roller path, the peripheries of the moving rollers forming a closed envelope, the rollers moving along the path while rotating themselves, when in contact with the dough, in the same direction as the movement of the plural conveyors.

9. An apparatus of claim 3, wherein the rollers of the roller mechanism are freely rotatable about their axes and arranged on a straight roller path, and the roller mechanism comprising means for moving the rollers back and forth longitudinally over the conveyors on the straight path.

* * * * *